W. W. HOFFMAN.
EYEGLASSES.
APPLICATION FILED JAN. 17, 1912.
1,058,748.
Patented Apr. 15, 1913.
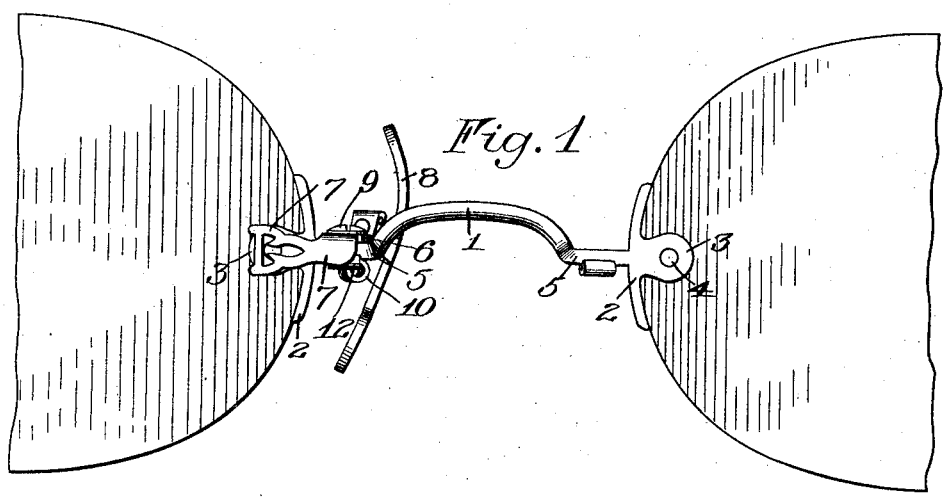
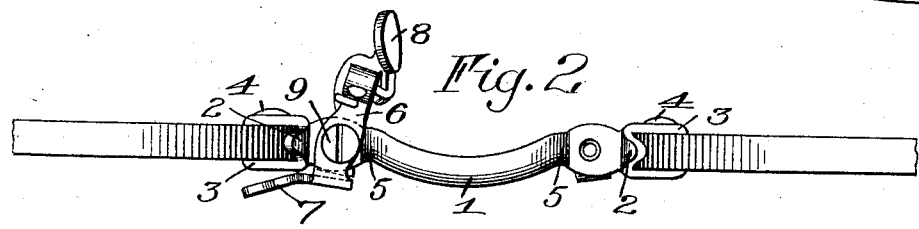
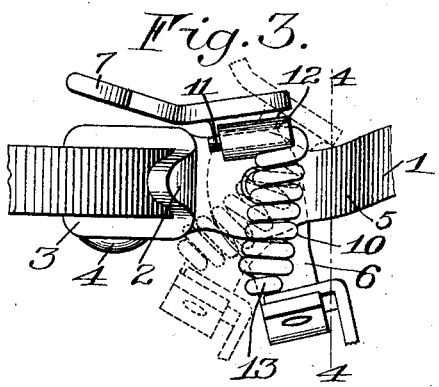
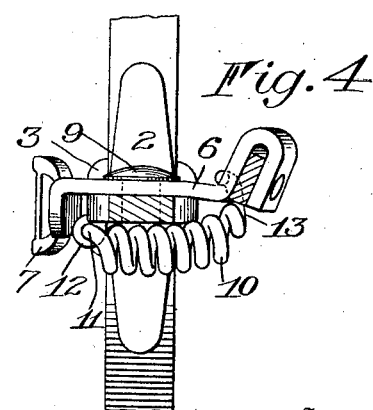
Inventor
William W. Hoffman
Witnesses
Walter B. Payne
Russell B. Griffith
By
his Attorneys
COLUMBIA PLANOGRAPH CO., WASHINGTON, D. C.

UNITED STATES PATENT OFFICE.

WILLIAM W. HOFFMAN, OF ROCHESTER, NEW YORK, ASSIGNOR TO E. KIRSTEIN SONS COMPANY, OF ROCHESTER, NEW YORK, A CORPORATION OF NEW YORK.

EYEGLASSES.

1,058,748. Specification of Letters Patent. Patented Apr. 15, 1913.

Application filed January 17, 1912. Serial No. 671,763.

*To all whom it may concern:*

Be it known that I, WILLIAM W. HOFFMAN, of Rochester, in the county of Monroe and State of New York, have invented certain new and useful Improvements in Eyeglasses; and I do hereby declare the following to be a full, clear, and exact description of the same, reference being had to the accompanying drawings, forming a part of this specification, and to the reference-numerals marked thereon.

My present invention relates to eyeglasses and more particularly to pince nez or eyeglasses of the type employing, or suitable for the employment of, a rigid bridge and in which the nose engaging portions are carried upon arms or levers held against the nose by spring pressure, and it has for its object to improve the efficiency and durability of the spring or springs that actuate the guards or nose bearing portions.

Further objects of the invention are to obtain simplicity of construction and operation and promote ease of manipulation of the several parts of the mounting, including the spring, during assembling, adjustment or repair.

To these and other ends the invention consists in certain improvements and combinations of parts all as will be hereinafter more fully described, the novel features being pointed out in the claims at the end of the specification.

In the drawings: Figure 1 is a front elevation of an eyeglass mounting constructed in accordance with and illustrating one embodiment of my invention, one of the guards and its actuating spring being removed; Fig. 2 is a top plan view; Fig. 3 is an enlarged bottom plan view of one of the guards and its actuating spring, and Fig. 4 is a vertical section taken substantially on the line 4—4 of Fig. 3.

Similar reference numerals throughout the several figures indicate the same parts.

In the present embodiment of the invention I employ a substantially rigid arched bridging portion 1 and lens attaching portions 2 having the usual securing straps 3 extending across the opposite faces of the lenses and perforated as are the lenses for the lens screws 4. Each end of the bridge and its adjacent lens attaching portion are joined by a connecting portion 5 forming seats for the guard levers 6, a description of which latter will suffice for both.

The eyeglass illustrated is of the finger piece type and each guard 6 is preferably mounted on top of its table or connecting portion 5 to extend horizontally from front to rear of the mounting, the forwardly projecting portion or arm being provided with a finger piece 7 and the rearwardly extending portion with a suitable nose engaging pad or pads 8, the said lever being pivoted at an intermediate point to turn on a headed screw or fastener 9 extending therethrough and secured in the connecting portion. The general operation and requirements of a finger piece eyeglass are too well known in the art to warrant mention herein.

The means for actuating the guard or moving its nose engaging portion 8 against the nose comprises a helical spring 10 that may be made of round wire or other suitable material, and is preferably arranged on the opposite side of the table or support 5 from that on which the guard lever is mounted, being in the present instance the under side. By a helical spring I mean one substantially as shown, the convolutions of which follow a point revolving about an axis and at the same time moving longitudinally of that axis, as in the generation of a helix. The axis of the spring is preferably arranged in a plane substantially parallel with the plane of pivotal movement of the guard lever 6 and also preferably so disposed as to extend substantially longitudinally of the guard or from front to rear of the mounting to reduce the pupilary distance and for other obvious reasons. One end is connected to the support and the other to the guard and the spring is, furthermore, so positioned that as the guard is vibrated by means of the finger piece to move its nose engaging portion away from the nose, it will be flexed transversely of its axis or distorted laterally as distinguished from a longitudinal compression or extension, such as springs of this form are usually subjected to to obtain resiliency and the pressure exerted by the spring in holding the guard against the nose constitutes a force acting in the same line or plane but in the opposite direction. It is preferable, therefore, that the spring be rigidly held at one end and for this purpose I provide a laterally projecting arm 11 thereon at the forward end that is received within a box or socket 12 soldered to or otherwise suitably carried on the under side of the part 5 or support, the longitudinal axis of the socket being disposed in the present instance transversely of the axis of the spring and the guard lever 6 and in or substantially parallel with the general plane of the eyeglass and of its lenses. The said arm 11 may be held by friction alone so that it is secure, though detachable, and the opposite end of the spring is also preferably detachably connected to the guard lever. The specific connection that I prefer may be supplied at this point by offsetting the outer convolution 13 of the coil that thus provides a hook engaging over the rear arm of the lever. I also prefer to arrange the points of connection of the two ends of the spring with their respective parts upon opposite sides of the pivot 9 or turning axis of the guard, as shown, one advantage thereof being that a longer coil may be used with relation to the length of the arm of the lever with which the spring coöperates.

By the employment of a spring of the character set forth arranged to act in the manner described, the spring always possesses considerable reserve strength; the strain is not centralized at any one point but distributed so that it is absorbed by the elasticity of the coiled length as a whole; its durability is, therefore, increased and an easy but firm pressure is exercised with the result that the guard levers act with great smoothness.

Of course, to obtain increased power from the spring its extensible elasticity may be taken advantage of by fixing the end 13 to the guard, as by soldering or otherwise, due to the fact that one point of anchorage moves in an arc relatively to which the other point of anchorage is stationary so that the two points approach and recede from each other according to the movement of the guard lever 6 but I do not consider this of extreme importance as the spring action first described is sufficient and the end 13 may, therefore, be allowed to slide upon the lever as the guard is actuated.

I claim as my invention:

1. In eyeglasses, the combination with a support comprising a substantially rigid bridging portion and a lens attaching portion, and a guard lever pivoted to the support and provided with a finger portion and a nose bearing portion, of a helical spring for operating the guard connected to the latter and to the support and adapted to be flexed in a direction transversely of its axis as the bearing portion of the guard moves toward and from the nose.

2. In eyeglasses, the combination with a support comprising a substantially rigid bridging portion and a lens attaching portion, and a guard lever pivoted to the support and provided with a finger portion and a nose bearing portion, of a helical spring for operating the guard connected to the latter and to the support and arranged with its axis extending substantially longitudinally of the guard lever so that it is flexed in a direction transversely of its axis as the nose bearing portion of the guard moves toward and from the nose.

3. In eyeglasses, the combination with a support comprising a bridging portion and a lens attaching portion, and a guard lever pivoted to the support and provided with a finger portion and a nose bearing portion, of a helical spring for positioning the guard disposed with its axis transverse to the axis of the latter and coöperating with the guard on one side of its turning axis and with the support on the opposite side of such turning axis.

4. In eyeglasses, the combination with a support comprising a bridging portion and a lens attaching portion, and a guard lever pivoted to the support and provided with a finger portion and a nose bearing portion, of a helical spring for positioning the guard arranged with its axis extending substantially longitudinally of the latter and having one end coöperating therewith on one side of the turning axis of the guard and its other end coöperating with the support on the opposite side of the turning axis of the guard.

5. In eyeglasses, the combination with a support, of a horizontally arranged finger piece guard lever pivoted to turn on one side thereof and a spring for operating the guard embodying a helical coil arranged on the opposite side of the support with its axis extending substantially parallel with the guard lever, the opposite ends of the spring being connected to the support and the guard lever, respectively, upon opposite sides of the turning axis of the latter.

6. In eyeglasses, the combination with a support, and a finger piece guard lever pivoted thereon, of a helical spring for actuating the guard lever connected to the latter at one end and to the support at the other arranged with its axis extending substantially parallel with the plane of pivotal movement of the guard and adapted to be flexed transversely of its own axis as the guard is vibrated.

7. In eyeglasses, the combination with a support and a finger piece guard lever pivoted thereon, of a helical spring for operating the guard lever connected at one end to the latter on one side of the said pivot and at the other end to the support on the other side of said pivot, said spring being arranged with its axis extending substantially parallel with the plane of pivotal movement of the guard and adapted to be flexed transversely of its own axis as the guard is vibrated.

8. In eyeglasses, the combination with a support and a finger piece guard lever pivoted thereto, of a helical spring for positioning the guard having its respective ends connected to the latter and to the support and arranged to be flexed transversely of its own axis as the guard is vibrated and means for securing one end of the spring comprising a transversely extending arm thereon and a socket on the part to which it is connected into which the arm projects.

9. In eyeglasses, the combination with a support and a finger piece guard lever pivoted thereto, of a helical spring for positioning the guard having its respective ends connected to the latter and to the support and arranged to be flexed transversely of its own axis as the guard is vibrated, an outer convolution at one end of the spring being offset to provide a hooked securing means for coöperation with the part to which it is attached.

10. In eyeglasses, the combination with a support comprising a substantially rigid bridging portion and a lens attaching portion, of a guard arm pivoted thereon and provided with a nose engaging portion and a helical spring for holding the guard against the nose, connected at one end to the guard arm and at the other to the support and adapted to be flexed in a direction transversely of its own axis when the guard is moved away from the nose.

WILLIAM W. HOFFMAN.

Witnesses:
RUSSELL B. GRIFFITH,
H. E. STONEBRAKER.

Copies of this patent may be obtained for five cents each, by addressing the "Commissioner of Patents, Washington, D. C."